United States Patent
Yoo et al.

(10) Patent No.: US 7,567,748 B1
(45) Date of Patent: *Jul. 28, 2009

(54) METHOD AND APPARATUS FOR CREATING AND USING SEARCH INFORMATION

(75) Inventors: Jea-Yong Yoo, Seoul (KR); Byung-Jin Kim, Kyunggi-do (KR); Kang-Soo Seo, Kyunggi-do (KR); Ki Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,965

(22) Filed: Dec. 21, 1999

(30) Foreign Application Priority Data

Jan. 4, 1999 (KR) .................................. 99-00603

(51) Int. Cl.
H04N 5/00 (2006.01)
H04N 5/91 (2006.01)

(52) U.S. Cl. ........................................ 386/125; 386/69

(58) Field of Classification Search ............ 386/69–70, 386/95, 111–112, 125–126, 109, 124, 104, 386/105, 45, 46
See application file for complete search history.

(56) References Cited

U.S. PATENT DOCUMENTS

| | | | |
|---|---|---|---|
| 5,168,356 A | | 12/1992 | Acampora et al. |
| 5,390,027 A | | 2/1995 | Henmi et al. |
| 5,701,383 A | | 12/1997 | Russo et al. |
| 5,771,334 A | * | 6/1998 | Yamauchi et al. ............. 386/95 |
| 6,006,004 A | * | 12/1999 | Moriyama et al. ............ 386/46 |
| 6,078,727 A | * | 6/2000 | Saeki et al. .................. 386/125 |
| 6,167,189 A | * | 12/2000 | Taira et al. .................... 386/95 |
| 6,259,858 B1 | * | 7/2001 | Ando et al. ................... 386/95 |
| 6,285,825 B1 | * | 9/2001 | Miwa et al. .................... 386/98 |
| 6,343,180 B1 | * | 1/2002 | Kim ............................... 386/65 |
| 6,408,338 B1 | * | 6/2002 | Moon et al. .................. 709/231 |
| 6,470,135 B1 | * | 10/2002 | Kim et al. ...................... 386/68 |
| 6,553,086 B1 | * | 4/2003 | Yoo et al. .................... 375/354 |

(Continued)

FOREIGN PATENT DOCUMENTS

EA 0 215 133 3/1987

(Continued)

OTHER PUBLICATIONS

Krieg, Bernhard; Digitale Audiotechnik ohne Ballast; Moderne Verfahren, Technik Gerate, praktische Hinwiese und Tips; 1992 Franzis-Verlag GmbH & Co. KG, Muchen; pp. 166-187.

*Primary Examiner*—Robert Chevalier
(74) *Attorney, Agent, or Firm*—Birch, Stewart, Kolasch & Birch, LLP

(57) ABSTRACT

In a method for creating and recording management information for searching recorded digital data streams when a digital data stream is recorded on a recording medium, index information for pointing to the location of the time information corresponding to the first stream object unit of each stream object on a time information table is created and recorded. When reproducing or searching the recorded digital data stream, a stream object is found using the time information of stream objects and the recording location corresponding to a requested search time is found using the index information.

35 Claims, 5 Drawing Sheets

U.S. PATENT DOCUMENTS

| | | |
|---|---|---|
| 6,580,873 B2 * | 6/2003 | Ando et al. ............ 386/95 |
| 7,050,702 B2 | 5/2006 | Ando et al. |
| 7,454,125 B2 * | 11/2008 | Yoo et al. ............ 386/125 |
| 7,477,834 B2 * | 1/2009 | Kim et al. ............ 386/125 |
| 2006/0190467 A1 | 8/2006 | Kim et al. |
| 2008/0075421 A1 | 3/2008 | Kim et al. |

FOREIGN PATENT DOCUMENTS

| | | |
|---|---|---|
| EP | 0 797 204-A 2 | 9/1997 |
| JP | 03-093084 A | 4/1991 |
| JP | 05-074053 A | 3/1993 |
| JP | 08-031106 A | 2/1996 |
| JP | 06-124362 | 5/1996 |
| JP | 08-212761 A | 8/1996 |
| JP | 09-023404 A | 1/1997 |
| JP | 10-154389 A | 6/1998 |
| JP | 10-320914 | 12/1998 |
| WO | WO-95/23411 A1 | 8/1995 |

* cited by examiner

METHOD AND APPARATUS FOR CREATING AND USING SEARCH INFORMATION

BACKGROUND OF THE INVENTION

1. Field of the Invention

The present invention relates to a method for creating search information for searching digital data streams recorded on a recording medium and relates to a method and apparatus for searching for requested data using the search information.

2. Description of the Related Art

In a conventional analog television broadcast, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, the satellite and cable broadcast industries are also moving towards digital broadcasts.

The digital broadcast offers several advantages that its analog counterpart cannot provide. For example, the digital broadcast is capable of providing services with far more improved video/audio quality, transmitting several different programs within a fixed bandwidth, and offering enhanced compatibility with digital communication media or digital storage media.

In the digital broadcast, a plurality of programs encoded based upon the MPEG format are multiplexed into a single transport stream before they are transmitted. The transmitted transport stream is received by a set top box at the receiver and demultiplexed into the original programs. If a program is chosen from among the demultiplexed programs, the chosen program is decoded by a decoder in the set top box and original audio and video signals are retrieved. The retrieved audio and video signals can be presented by an A/V output apparatus such as a TV.

It is also possible to record the received digital broadcast signals on a storage medium instead of directly outputting the received broadcast signals to A/V output devices. The stored digital broadcast signals can be edited and retrieved afterwards. For example, a digital data stream received by the set top box can be transmitted to a streamer such as a digital video disk (DVD) recording apparatus through communication interfaces such as an IEEE-1394 serial bus and stored in the streamer. The stored digital data stream can be edited and transmitted back to the set top box so that the digital audio and video data can be presented.

For recording a received digital broadcast stream on a recording medium, it is necessary to develop schemes to organize the digital data stream on the recording medium and to create management information for rapid access to the recorded data stream.

SUMMARY OF THE INVENTION

It is an object of the present invention to provide a method for recording received digital data streams on a recording medium as groups of stream objects and creating search information for each stream object and a method for searching for requested data using the search information.

The method for creating and recording search information for recorded digital data streams in accordance with the present invention comprises the steps of recording a received digital data stream by grouping the received digital data stream into stream object units, creating and recording time information for each stream object unit, and creating and recording index information for pointing to the location on the time information for each stream object as management information for the stream object. When reproducing or editing the recorded digital data streams, the data recording position corresponding to a requested search time can be found with reference to the index information.

BRIEF DESCRIPTION OF THE DRAWINGS

The accompanying drawings, which are included to provide a further understanding of the invention, illustrate preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
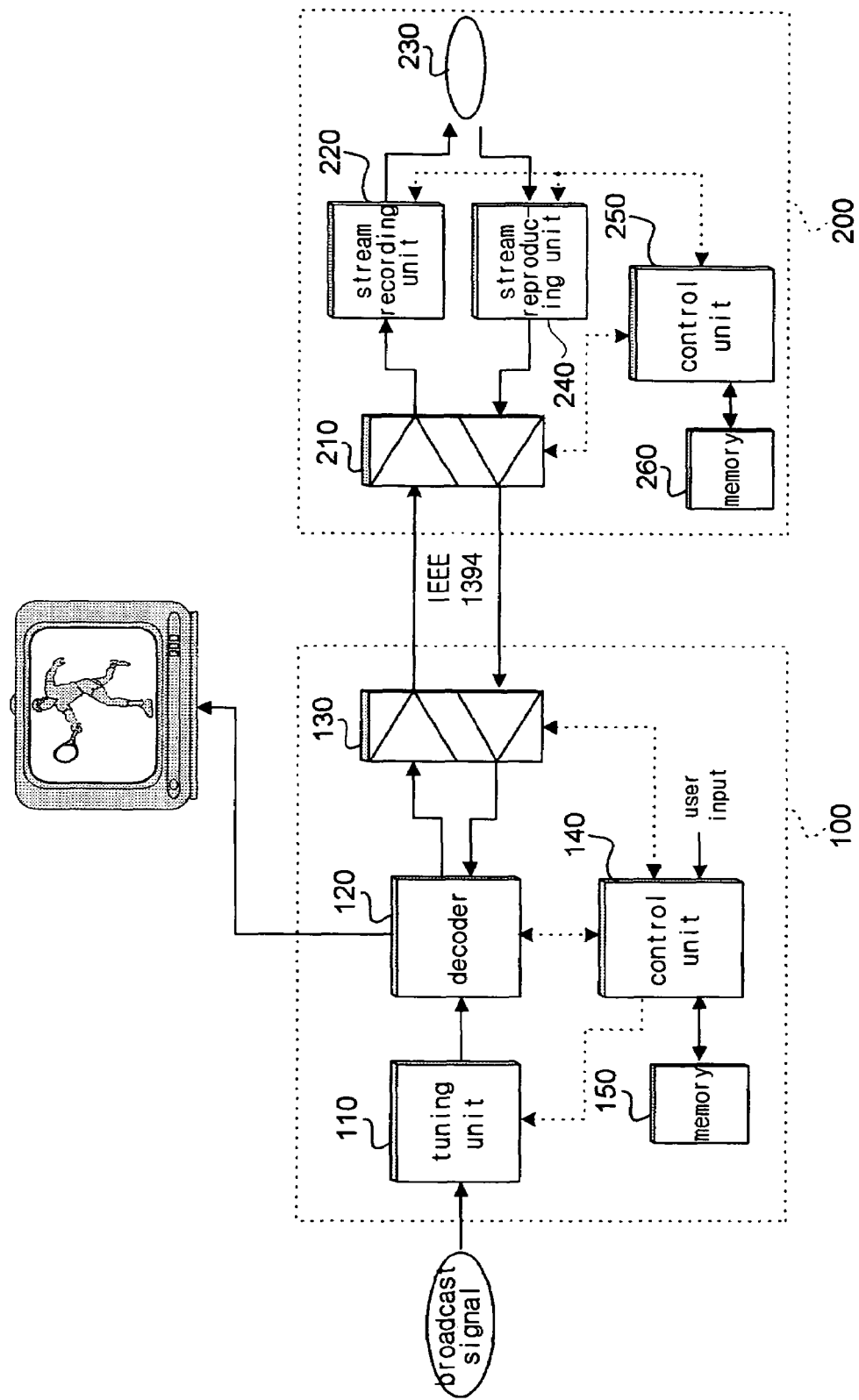
FIG. 1 is a block diagram of an apparatus in which the present invention may be advantageously employed.

FIG. 1 depicts a block diagram of an apparatus in which the present invention may be advantageously employed. The apparatus comprises a set top box 100, a communication interface (IEEE-1394), and a streamer 200.

The set top box 100 receives transport streams encoded by system encoders and broadcast by a plurality of broadcasting stations and demultiplexes the received transport streams. After a system decoder 120 decodes the transport stream of a program tuned by a tuning unit 110, a control unit 140 outputs the decoded transport stream to an A/V output device such as a TV set for presentation.

The set top box 100 may transmit a program chosen by a user to the streamer 200 through the IEEE-1394 interface so that the transmitted program is recorded on a recording medium 230 such as a digital video disk by the streamer 200.

Upon a request by a user, the set top box 100 may receive a program retrieved from the recording medium 230 by the streamer 200 through the IEEE-1394 communication interface so that the received program can be presented on a TV set after being decoded by the decoder 120.

For carrying out these tasks, the set top box 100 and the streamer 200 should be able to access the management information regarding the programs recorded on the recording medium 230. To this end, information files are used to deal with the recorded data. An application information file is utilized by the set top box 100 and a streamer information file is utilized by the streamer 200. A common information file is utilized by both the set top box 100 and the streamer 200. These information files are recorded on the recording medium 230.

The application information file is retrieved by a stream reproducing unit 240 of the streamer 200 when the set top box 100 is initialized or requests the file. The retrieved application information is transmitted to the set top box 100 through the IEEE-1394 communication interface and loaded into the management information area M2 of a memory 150 by a control unit 140 of the set top box 100. When a new program is recorded or recorded data is edited, the application information loaded in the memory 150 is updated by the control unit 140 to include management information on the newly recorded or edited program. If a user requests retrieval of a specific program, the control unit 140 requests the streamer 200 to retrieve the program, with reference to the application information. When the set top box 100 terminates a recording mode or is shut down, the application information in the memory 150 is transmitted through the IEEE-1394 communication interface to the streamer 200 and recorded on the recording medium 230 by a stream recording unit 220 controlled by a control unit 250 of the streamer 200.

The streamer information file and common information file are retrieved by the stream reproducing unit 240 of the streamer 200 when the streamer 200 is initialized and loaded into a memory 260 by the control unit 250 of the streamer 200. When a new program is recorded or recorded data is edited, the streamer and common information is updated to include management information on the newly recorded or edited program by the control unit 250. If a user requests retrieval of a specific program, the control unit 250, responsive to a request signal from the set top box 100 retrieves the associated program recorded on the recording medium 230 with reference to the streamer and common information loaded in the memory 260. When the set top box 100 terminates a recording mode or is shut down, the streamer and common information in the memory 260 are recorded on the recording medium 230 by the stream recording unit 220 controlled by the control unit 250.

The syntax of the information files and the structure of recorded data will be explained with reference to FIG. 2.

Figure 2:
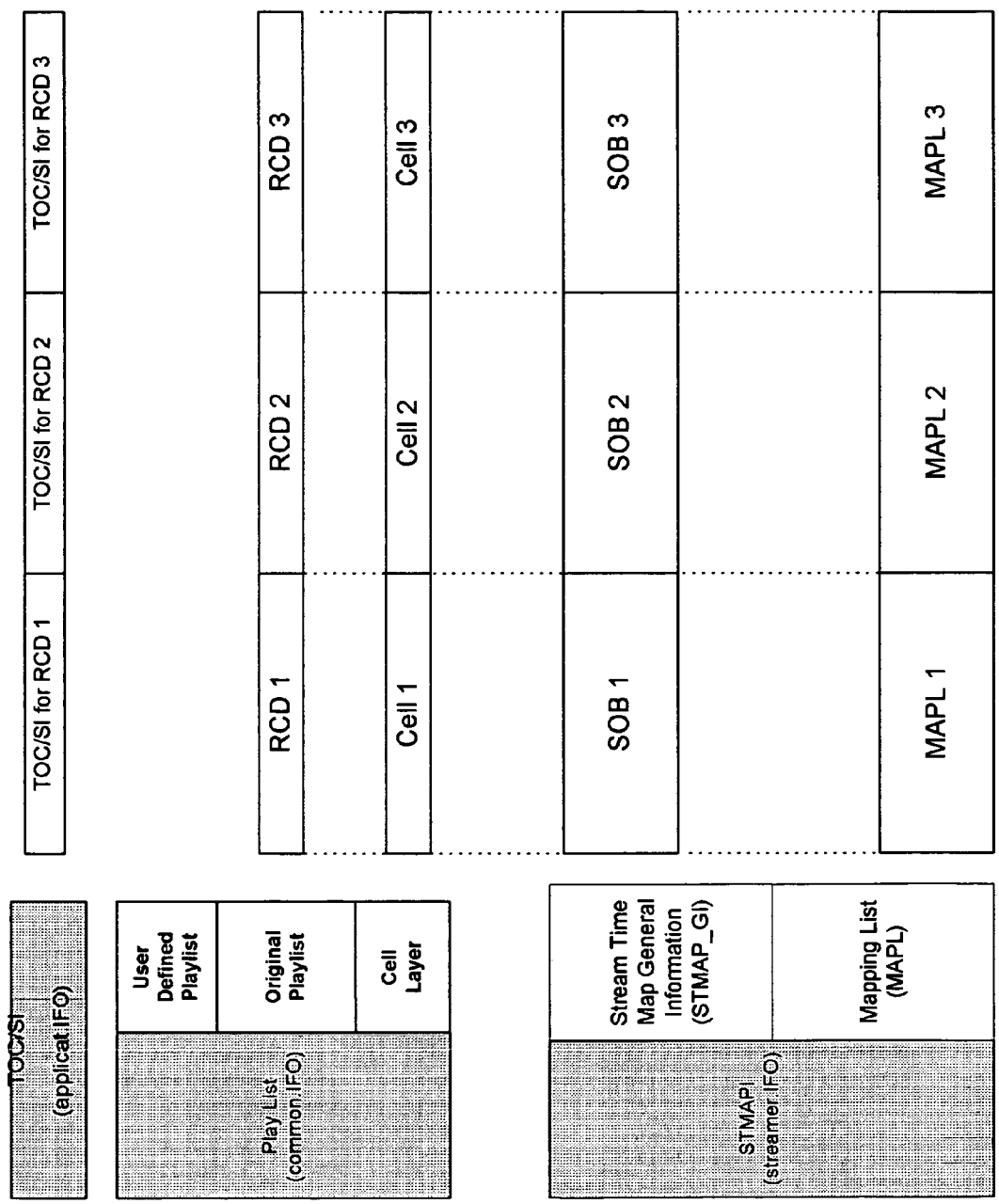
FIG. 2 is the syntax of the management information created by the method for creating search information for recorded digital data streams in accordance with the present invention.

As shown in FIG. 2, the application information file (application.IFO) comprises a table of content (TOC) and a service information (SI) table. The table of content (TOC) contains random-access entry points that allow random access to the recorded data stream and the service information (SI) table contains the information on the recorded digital stream. The common information file (common.IFO) contains an original playlist automatically created when a digital data stream is recorded, presentation sequence information (Cell) of the recorded data stream, and a user-defined playlist created when a user edits the presentation sequence of the recorded data stream.

The streamer information file (streamer.IFO) is intended to deal with stream time map general information (STMAP_GI) and a mapping list (MAPL). The stream time map general information (STMAP_GI) is management information regarding stream object units (SOBUs) organized on the recording medium and stream objects (SOBs) each, of which comprises a plurality of stream object units (SOBUs) and the mapping list (MAPL) is time search information regarding the stream object units (SOBUs) and stream objects (SOBs). Each stream object (SOB) has a one-to-one correspondence with each Cell contained in the original playlist and each Cell is contained in the user-defined playlist and has a one-to-one correspondence with each stream object (SOB).

Figure 3:
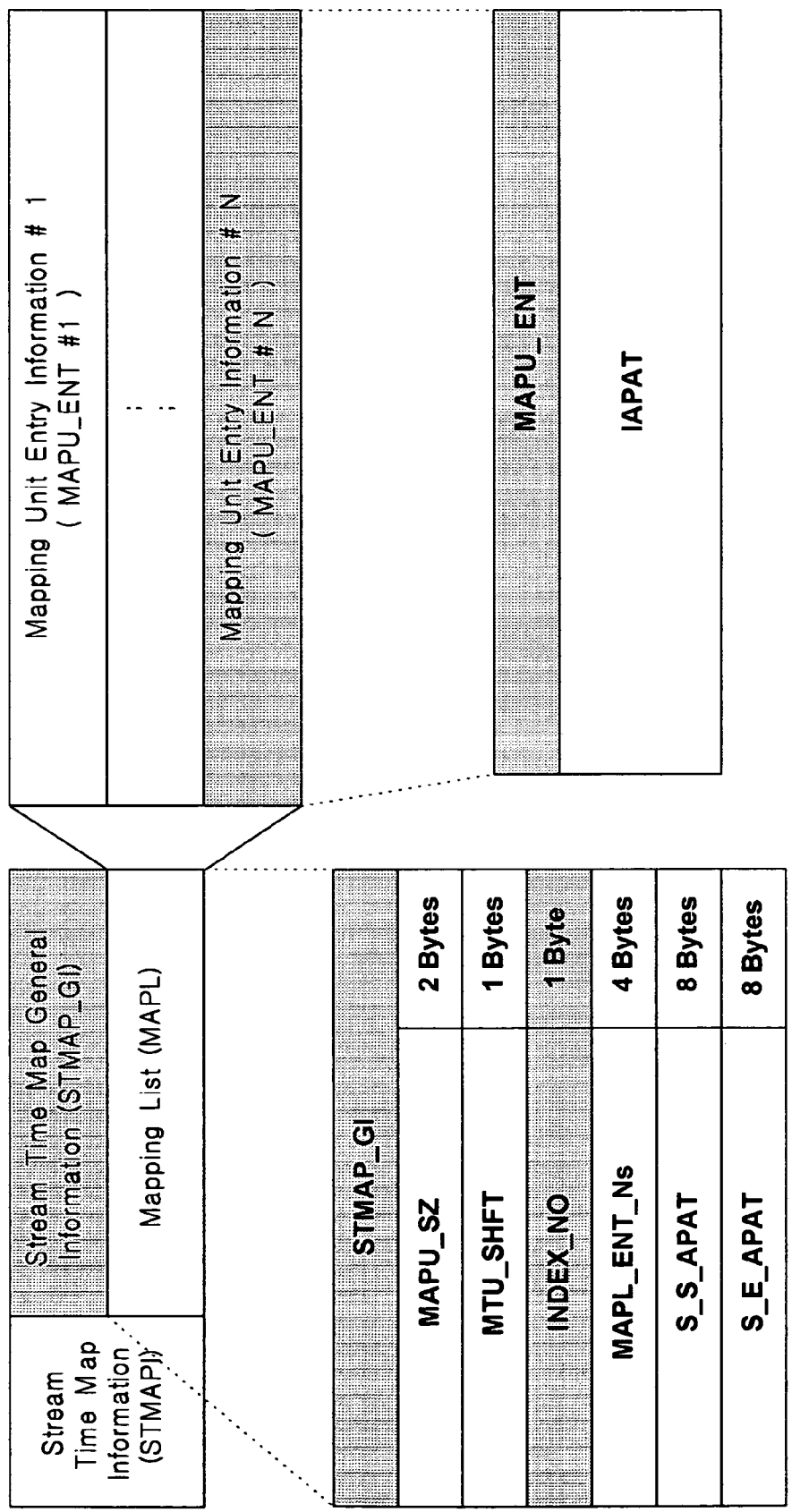
FIG. 3 is a pictorial representation of the stream time map information as a part of the management information created by the method for creating search information for recorded digital data streams in accordance with the present invention.

The stream time map general information (STMAP_GI), as shown in FIG. 3, comprises several fields representing the stream object unit size (MAPU_SZ), the weight of the LSB of the mapping list entries (MTU_SHFT), index number (INDEX_NO) indicating an arbitrary entry of the mapping list (MAPL), the number of mapping list entries (MAPL_ENT_Ns), start packet arrival time (S_SAPAT), and last packet arrival time (S_E_APAT). The mapping list (MAPL) comprises mapping entries (MAPU_ENT), each mapping entry containing the incremental application packet time (IAPAT).

The method for creating and recording search information for recorded digital data streams in accordance with an embodiment of the present invention will be explained with reference to FIGS. 1, 2, and 3. If a user requests recording of a received digital data stream on the recording medium 230, the control unit 140 of the set top box 100 notifies the control unit 250 of the streamer 200 that a recording mode has been set and begins to transmit the received digital data stream to the streamer 200 through the IEEE-1394 interface. Concurrently, the control unit 140 of the set top box 100 records the entry point information that allows random access to the transport stream packets of the digital data stream in the application information (application.IFO) loaded in the management information area (M2) of the memory 150 or records the entry point information in the common information (common.IFO) as a part of the playlist. Also, the control unit 140 detects the information on the data stream currently being recorded from the program service information (SI) loaded in the program information area (M1) of the memory 150 and records the service information in the service information (SI) table of the application information (application.IFO).

The control unit 250 of the streamer 200 controls the stream recording unit 220 so that the data stream received through the IEEE-1394 communication interface is recorded on the recording medium 230. The data stream is organized in sectors on the recording medium 230 and a predetermined number of sectors constitute a stream object unit (SOBU). The process is repeated until the recording mode terminates, thereby creating a stream object (SOB) which is a group of data streams recorded by a single recording operation.

Figure 4:
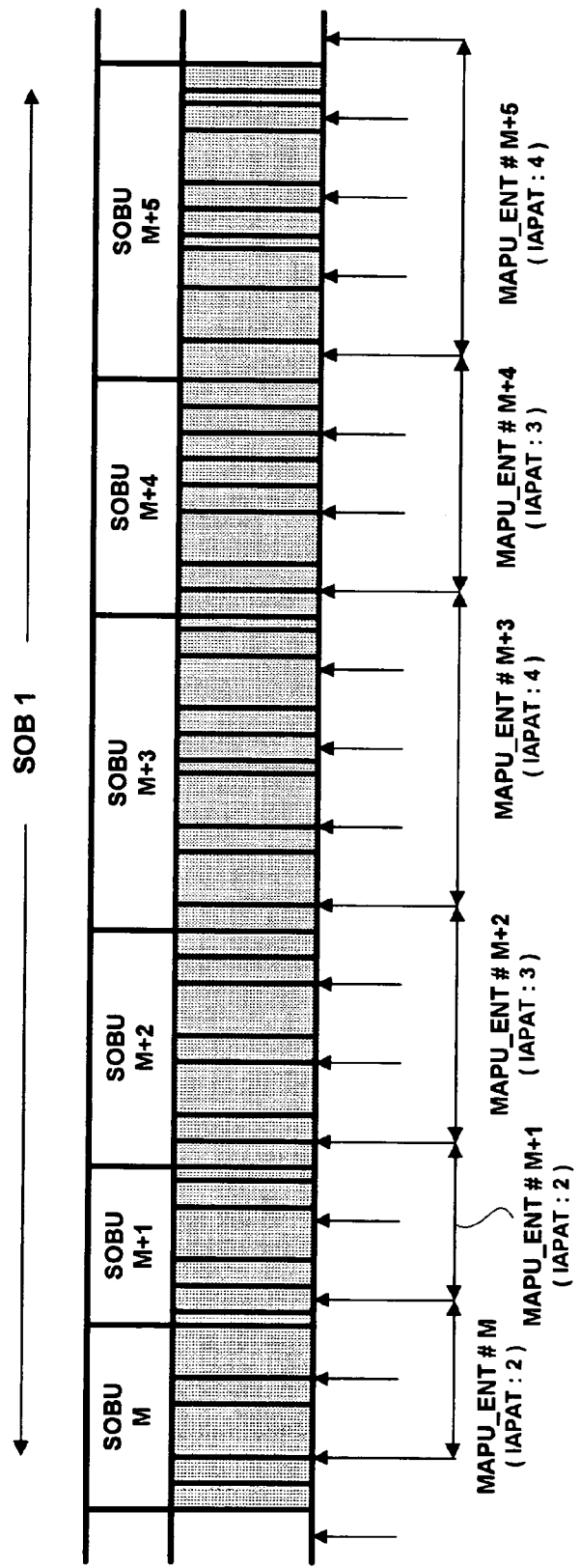
FIG. 4 is a pictorial representation for explaining the digital data stream recording operation in accordance with the present invention.
Figure 5:
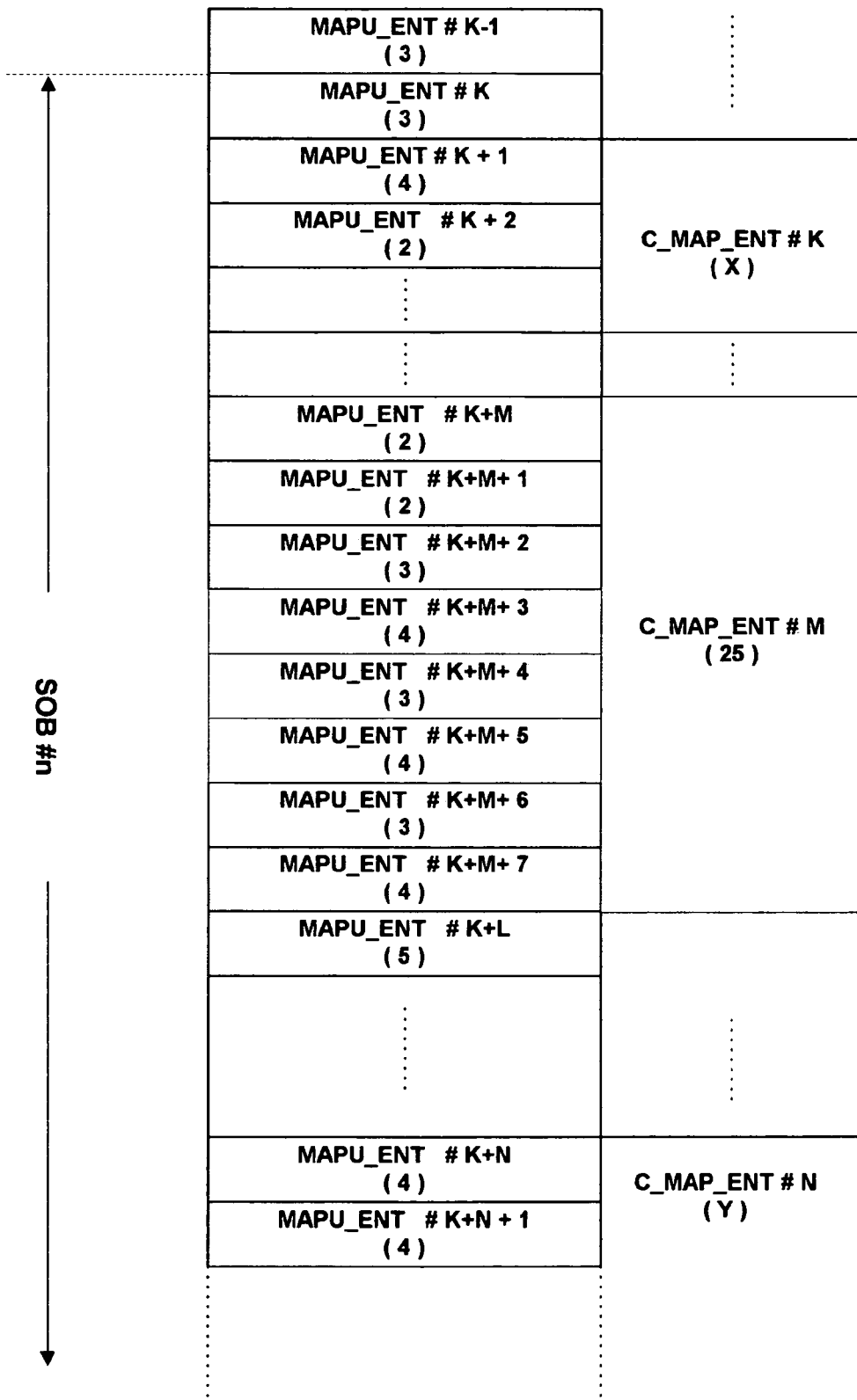
FIG. 5 is a pictorial representation for explaining the management information created by the method for creating search information for recorded digital data streams in accordance with the present invention.

The control unit 250 of the streamer 200 creates presentation sequence information (Cell) regarding the created stream object (SOB) and records the Cell in the Cell layer of the common information (common.IFO) as presentation sequence information corresponding to the record (RCD) of the original playlist. For searching for stream object units (SOBUs) constituting the stream object (SOB), the time length of every stream object unit (SOBU) is sequentially recorded in the mapping list (MAPL). To be more specific, a count value counted at a constant time interval while a stream object unit (SOBU) is created, namely, the incremental application packet time (IAPAT) is recorded in the mapping entry field (MAPU_ENT) corresponding to the associated stream object unit (SOBU), as shown in FIGS. 4 and 5. In addition, the sum of a predetermined number of incremental application packet times IAPATs (the numbers parenthesized in FIG. 5) is calculated and the sum is recorded as a coarse mapping entry (C_MAP_ENT) which is coarse search time information.

The index number (INDEX_NO) of the first mapping entry (MAPU_ENT) of the mapping list (MAPL) or the first coarse mapping entry (C_MAP_ENT) associated with the stream object (SOB) is recorded in the stream time map general information (STMAP_GI). In FIG. 5, the index number K of the first mapping entry related to the stream object SOB #n is recorded as identification information for indexing the location of the stream object SOB #n.

If a user requests retrieval of a certain interval of a data stream recorded on the recording medium, for example recorded data corresponding to the time interval from 10 minutes to 20 minutes, the control unit 150 of the streamer 200 first searches Cells for a Cell (Cell 2 in FIG. 2) having a recording time corresponding to the start time 10 minutes. Then, the control unit 150 detects the index number pointing to the start position of the stream object SOB 2 corresponding to the chosen Cell 2 from the stream time map general information (STMAP_GI). Subsequently, the control unit 150 begins to detect the incremental application packet times (IAPATs), starting from the mapping entry pointed to by the index number. By summing the detected incremental application packet times (IAPATs) and multiplying the sum value by the unit time of each count, the start position of the stream object unit (SOBU) corresponding to the requested search time 10 minutes can be found. Finally, data retrieval begins from the transport stream packet whose packet arrival time coincides with the requested time.

If a user requests retrieval of the recorded data corresponding to the time interval from 40 minutes to 60 minutes and the Cell having a recording time corresponding to the requested time 40 minutes is Cell 3, the control unit 150 detects the index number pointing to the start position of the stream object SOB 3 corresponding to the chosen Cell 3 from the stream time map general information (STMAP_GI). Subsequently, the control unit 150 begins to detect the incremental application packet times (IAPATs) listed in the mapping list MAPL 3. By summing the detected incremental application packet times (IAPATs) and multiplying the sum value by the unit time of each count, the start position of the stream object unit (SOBU) corresponding to the requested time 40 minutes can be found. Finally, data retrieval begins from the transport stream packet whose packet arrival time coincides with the requested time.

The method for creating and recording search information for recorded digital data streams of the present invention enables rapid and precise search of a specific interval of the recorded digital data, provided that the digital data streams are recorded on a recording medium as groups of stream objects.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording a digital data stream on a recording medium, the method comprising:
   recording the digital data stream by dividing the digital data stream into stream objects;
   recording common information for the stream objects; and
   recording stream time map information in a stream information file of the recording medium, the stream time map information including a time mapping list for the stream objects,
   wherein the time mapping list includes a sub time mapping list, the sub time mapping list having time search information for searching the digital data stream, and
   wherein the common information and the stream information file are formed and managed as separate files.

2. The method of claim 1, wherein the step of recording the stream time map information includes recording stream time map general information in the stream information file, the stream time map general information including management information of the stream objects recorded on the recording medium.

3. The method of claim 2, wherein each of the stream objects has a plurality of stream object units, and the time mapping list has the time search information for searching each of the stream object units.

4. The method of claim 1, wherein the step of recording the common information includes recording a table of content in an application information file of the recording medium.

5. The method of claim 4, wherein the table of content includes random-access entry point information that allows random access to the recorded data stream.

6. The method of claim 1, wherein the step of recording the common information includes recording the common information in a common information file of the recording medium, the common information including a playlist for the stream objects.

7. The method of claim 6, wherein the common information further includes presentation sequence information of the recorded digital data stream.

8. An apparatus for recording a digital data stream on a recording medium, the apparatus comprising:
   a recording unit to record the digital data stream by dividing the digital data stream into stream objects, to record common information for the stream objects, and to record stream time map information in a stream information file of the recording medium, the stream time map information including a time mapping list for the stream objects,
   wherein the time mapping list includes a sub time mapping list, the sub time mapping list having time search information for searching the digital data stream, and
   wherein the common information and the stream information file are formed and managed as separate files.

9. The apparatus of claim 8, wherein the recording unit to record the stream time map information records stream time map general information in the stream information file, the stream time map general information including management information of the stream objects recorded on the recording medium.

10. The apparatus of claim 9, wherein each of the stream objects has a plurality of stream object units, and the time mapping list has the time search information for searching each of the stream object units.

11. The apparatus of claim 8, wherein the recording unit to record the common information records a table of content in an application information file of the recording medium.

12. The apparatus of claim 11, wherein the table of content includes random-access entry point information that allows random access to the recorded data stream.

13. The apparatus of claim 8, wherein the recording unit to record the common information records the common information in a common information file of the recording medium, the common information including a playlist for the stream objects.

14. The apparatus of claim 13, wherein the common information further includes presentation sequence information of the recorded digital data stream.

15. A computer-readable medium for recording digital data using a digital data recorder, the recording medium comprising:
   a digital data stream divided into stream objects;

common information recorded on the recording medium for the stream objects; and stream time map information recorded in a stream information file of the recording medium, the stream time map information including a time mapping list for the stream objects, wherein the time mapping list includes a sub time mapping list, the sub time mapping list having time search information for searching the digital data stream, and wherein the common information and the stream information file are formed and managed as separate files.

16. The computer-readable of claim 15, wherein the stream time map information includes stream time map general information in the stream information file, the stream time map general information including management information of the stream objects recorded on the recording medium.

17. The computer-readable of claim 16, wherein each of the stream objects has a plurality of stream object units, and the time mapping list has the time search information for searching each of the stream object units.

18. The computer-readable of claim 15, wherein the common information includes a table of content recorded in an application information file of the recording medium.

19. The computer-readable of claim 18, wherein the table of content includes random-access entry point information that allows random access to the recorded data stream.

20. The computer-readable of claim 15, wherein the common information is recorded in a common information file of the recording medium, the common information including a playlist for the stream objects.

21. The computer-readable of claim 20, wherein the common information further includes presentation sequence information of the digital data stream.

22. A method for searching a digital data stream on a recording medium, the method comprising:

reading the digital data stream which is divided into stream objects;

reading common information for the stream objects;

reading stream time map information in a stream information file recorded on the recording medium, the stream time map information including a time mapping list for the stream objects, the time mapping list including a sub time mapping list; and searching the digital data stream based on time search information included in the sub time mapping list, wherein the common information and the stream information file are formed and managed as separate files.

23. The method of claim 22, wherein the step of reading the stream time map information includes reading stream time map general information in the stream information file, the stream time map general information including management information of the stream objects recorded on the recording medium.

24. The method of claim 23, wherein each of the stream objects has a plurality of stream object units, and the time mapping list has the time search information for searching each of the stream object units.

25. The method of claim 22, wherein the step of reading the common information includes reading a table of content in an application information file of the recording medium.

26. The method of claim 25, wherein the table of content includes random-access entry point information that allows random access to the recorded data stream.

27. The method of claim 22, wherein the step of reading the common information includes reading the common information in a common information file of the recording medium, the common information including a playlist for the stream objects.

28. The method of claim 27, wherein the common information further includes presentation sequence information of the recorded digital data stream.

29. An apparatus for searching a digital data stream on a recording medium, the method comprising:

a reading unit to read the digital data stream which is divided into stream objects, to read common information for the stream objects, and to read stream time map information in a stream information file recorded on the recording medium, the stream time map information including a time mapping list for the stream objects, and the time mapping list including a sub time mapping list; and a searching unit to search the digital data stream based on time search information included in the sub time mapping list, wherein the common information and the stream information file are formed and managed as separate files.

30. The method of claim 29, wherein the reading unit to read the stream time map information reads stream time map general information in the stream information file, the stream time map general information including management information of the stream objects recorded on the recording medium.

31. The method of claim 30, wherein each of the stream objects has a plurality of stream object units, and the time mapping list has the time search information for searching each of the stream object units.

32. The method of claim 29, wherein the reading unit to read the common information reads a table of content in an application information file of the recording medium.

33. The method of claim 32, wherein the table of content includes random-access entry point information that allows random access to the recorded data stream.

34. The method of claim 29, wherein the reading unit to read the common information reads the common information in a common information file of the recording medium, the common information including a playlist for the stream objects.

35. The method of claim 34, wherein the common information further includes presentation sequence information of the recorded digital data stream.

* * * * *